(12) United States Patent
Yamada et al.

(10) Patent No.: US 10,997,465 B2
(45) Date of Patent: May 4, 2021

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventors: Takayuki Yamada, Kawasaki (JP); Akihiro Katayama, Tokyo (JP); Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 15/873,813

(22) Filed: Jan. 17, 2018

(65) Prior Publication Data
US 2018/0211138 A1    Jul. 26, 2018

(30) Foreign Application Priority Data

Jan. 20, 2017    (JP) .............................. JP2017-008219

(51) Int. Cl.
*G06K 9/00*    (2006.01)
*G06K 9/62*    (2006.01)
(Continued)

(52) U.S. Cl.
CPC ....... *G06K 9/6262* (2013.01); *G06K 9/00201* (2013.01); *G06K 9/6256* (2013.01); *G06K 2209/40* (2013.01)

(58) Field of Classification Search
USPC ................................ 382/156, 154, 103, 141
See application file for complete search history.

(56) References Cited

U.S. PATENT DOCUMENTS 6,259,960 B1 * 7/2001 Inokuchi ............ G01N 21/9501
   250/310
7,831,086 B2 * 11/2010 Kondo ................... H04N 5/262
   382/154
(Continued)

FOREIGN PATENT DOCUMENTS

JP    2010-218051 A    9/2010
JP    2012-028949 A    2/2012
(Continued)

OTHER PUBLICATIONS

Efficient Learning Method for Human Detection based on Automatic Generation of Training Samples with the Negative-Bag MILBoost;Graduate School of Engineering,(3hubu University,1200 Matsumoto, Kasugai,Aichi,487-8501 Japan.

*Primary Examiner* — Kathleen Y Dulaney
(74) *Attorney, Agent, or Firm* — Canon U.S.A., Inc. I.P. Division

(57) ABSTRACT

An information processing device includes a first acquiring unit configured to acquire geometric information relating to a target object to be recognized, a decision unit configured to decide an imaging position and orientation at which the target object is imaged, based on the geometric information acquired by the first acquiring unit, a second acquiring unit configured to acquire an image of the target object which has been captured at the imaging position and orientation decided by the decision unit, and a generation unit configured to generate learning data, based on the geometric information acquired by the first acquiring unit and the image acquired by the second acquiring unit.

22 Claims, 9 Drawing Sheets

(51) Int. Cl.
*G06T 15/00* (2011.01)
*G05B 19/00* (2006.01)

(56) References Cited

U.S. PATENT DOCUMENTS

| | | | | |
|---|---|---|---|---|
| 8,115,761 | B1* | 2/2012 | Fan | G06T 7/55 345/419 |
| 8,805,034 | B2* | 8/2014 | Lehmann | G06T 19/00 382/128 |
| 2001/0009135 | A1* | 7/2001 | Hasebe | G03F 7/162 118/52 |
| 2002/0050988 | A1* | 5/2002 | Petrov | G06K 9/20 345/418 |
| 2004/0247174 | A1* | 12/2004 | Lyons | G06T 17/10 382/154 |
| 2005/0237581 | A1* | 10/2005 | Knighton | H04N 13/204 358/473 |
| 2006/0233423 | A1* | 10/2006 | Najafi | G06T 7/75 382/103 |
| 2008/0095416 | A1* | 4/2008 | Jeung | A61B 90/36 382/128 |
| 2009/0096790 | A1* | 4/2009 | Wiedemann | G06K 9/00201 345/427 |
| 2009/0123045 | A1* | 5/2009 | Quadling | G06T 15/04 382/128 |
| 2009/0213219 | A1* | 8/2009 | Eggert | G06T 7/277 348/148 |
| 2010/0191391 | A1* | 7/2010 | Zeng | G01S 13/87 701/1 |
| 2011/0115899 | A1* | 5/2011 | Kaida | H05K 13/081 348/87 |
| 2011/0206237 | A1* | 8/2011 | Saruta | G01B 11/00 382/103 |
| 2012/0182392 | A1* | 7/2012 | Kearns | B25J 19/023 348/46 |
| 2012/0201469 | A1* | 8/2012 | Livet | G06T 7/246 382/201 |
| 2012/0321134 | A1* | 12/2012 | Shen | G06K 9/00208 382/103 |
| 2013/0230235 | A1* | 9/2013 | Tateno | G06T 19/003 382/154 |
| 2013/0343640 | A1* | 12/2013 | Buehler | G06N 20/00 382/155 |
| 2015/0243031 | A1* | 8/2015 | Narasimha | G06K 9/6256 382/103 |
| 2016/0034746 | A1* | 2/2016 | Harada | G06T 7/521 382/154 |
| 2016/0154994 | A1* | 6/2016 | Kim | G06K 9/00208 382/118 |
| 2016/0217318 | A1* | 7/2016 | Hayasaka | G06K 9/00288 |
| 2017/0151027 | A1* | 6/2017 | Walker | A61B 34/37 |
| 2018/0039848 | A1* | 2/2018 | Konolige | G06T 7/344 |

FOREIGN PATENT DOCUMENTS

| | | |
|---|---|---|
| JP | 201288787 A | 5/2012 |
| JP | 2013-541775 A | 11/2013 |
| JP | 2014178957 A | 9/2014 |
| JP | 2014-199584 A | 10/2014 |

* cited by examiner

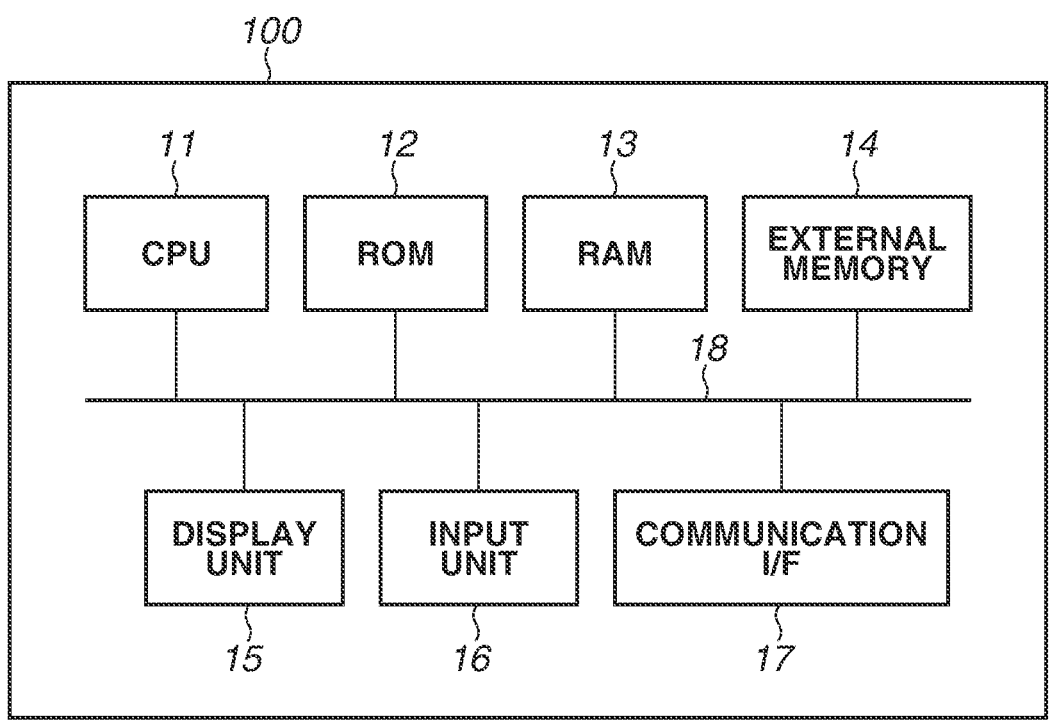

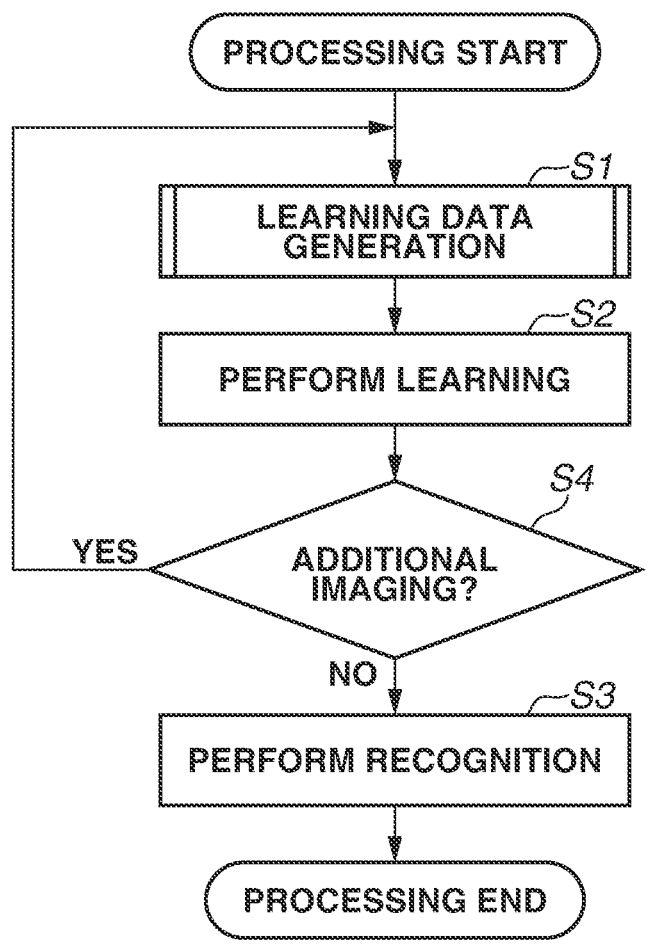

INFORMATION PROCESSING DEVICE, INFORMATION PROCESSING METHOD, AND STORAGE MEDIUM

BACKGROUND

Field of the Disclosure

The present disclosure relates to an information processing device, an information processing method, and a storage medium.

Description of the Related Art

A method by which features and a pattern of a target object are learned from an image that is obtained by imaging the target object, or a depth image (distance image) to recognize the target object, is conventionally used. When employing the method, to improve capability of recognizing the target object, it is necessary to obtain learning data by imaging the target object from various directions and in various sizes, and to give to the learning data a label suitable for the recognition of each captured images as a teacher signal. For example, to recognize a center position of the target object, it is necessary to image the target object from various positions and orientations to provide the center position of the target object in each of the images. As described above, to generate the learning data a lot of work is required.

Therefore, a method for virtually increasing variation of photo-presentations has been proposed as a technique for collecting the learning data. Japanese Patent Application Laid-Open No. 2012-88787 discusses a method for increasing the variation by applying image processing such as enlargement/reduction and rotation to the obtained image. In addition, Masamitsu Tsuchiya, et al., "Efficient Learning Method for Human Detection based on Automatic Generation of Training Samples with the Negative-Bag MILBoost", Meeting on Image Recognition and Understanding (MIRU2012), August 2012 discusses a method of creating a virtually obtained image with use of computer graphics (CG).

In the method for virtually increasing the variation of photo-presentations through image processing, however, it is necessary to generate learning data from actual images because original learning data to be subjected to the image processing or learning data for additional learning is required. Further, in the method for creating the virtually obtained image with use of CG, precise model data of the target object is necessary in order to increase recognition accuracy. Moreover, it is necessary to perform sufficient adjustment of a virtual environment in order to match a light source and the like to an actual imaging environment.

SUMMARY

The present disclosure is directed to easily generating the learning data adaptable to a use application for recognizing the target object.

According to an aspect of the present disclosure, an information processing device includes a first acquiring unit configured to acquire geometric information relating to a target object to be recognized, a decision unit configured to decide an imaging position and orientation at which the target object is imaged, based on the geometric information acquired by the first acquiring unit, a second acquiring unit configured to acquire an image of the target object which has been imaged at the imaging position and orientation decided by the decision unit, and a generation unit configured to generate learning data, based on the geometric information acquired by the first acquiring unit and the image acquired by the second acquiring unit.

Further features of the present disclosure will become apparent from the following description of exemplary embodiments with reference to the attached drawings.

BRIEF DESCRIPTION OF THE DRAWINGS

FIG. 2 illustrates an example of a hardware configuration of an information processing device according to one or more aspects of the present disclosure.

FIG. 9 is a flowchart illustrating processing by an information processing device according to one or more aspects of the present disclosure.

DESCRIPTION OF THE EMBODIMENTS

Various exemplary embodiments of the present disclosure are described in detail below with reference to accompanying drawings. The exemplary embodiments described below are examples as an implementation approach of the present disclosure, and are appropriately modified or alternated depending on a configuration of an apparatus to which the present disclosure is applied and various kinds of conditions, and the present disclosure is not limited to the following exemplary embodiments.

Figure 1:
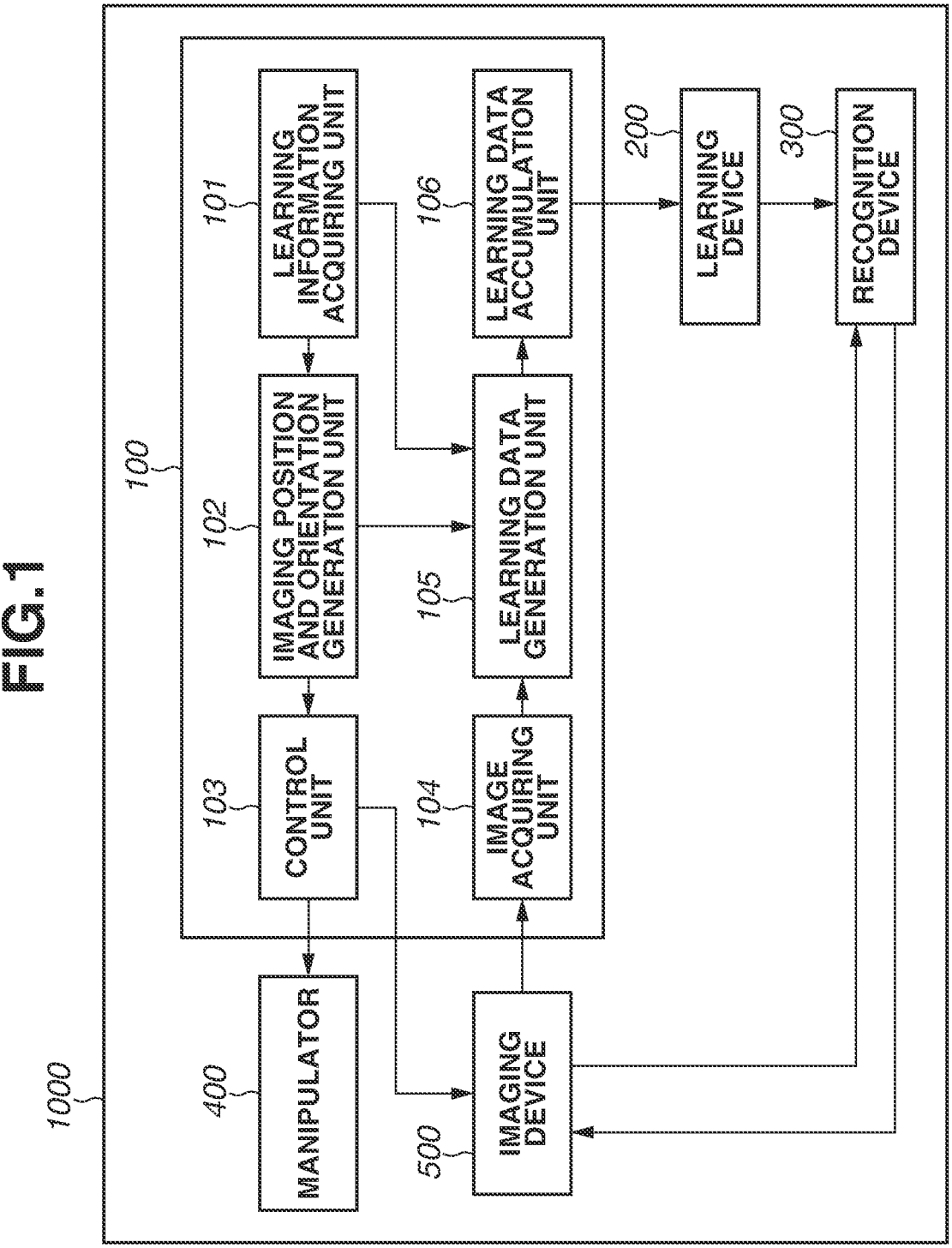
FIG. 1 is a diagram illustrating a configuration of an object recognition apparatus according to one or more aspects of the present disclosure.

A first exemplary embodiment of the present disclosure will be described below. FIG. 1 is a diagram illustrating a configuration example of an object recognition apparatus 1000 including an information processing device 100 according to. The information processing device 100 generates learning image (image with label added) as learning data, based on images that are obtained by imaging a recognition target object, according to a plurality of imaging positions and orientations. The object recognition apparatus 1000 mechanically learns a model with use of the learning data generated by the information processing device 100, and recognizes the target object in the image with use of the learned model.

In the first exemplary embodiment, the object recognition apparatus 1000 learns the model through convolution neural network (CNN) that is a kind of deep learning. The object recognition apparatus 1000 then recognizes the object in the image with use of the learned CNN model. Moreover, in the first exemplary embodiment, the information processing device 100 acquires learning information associated with the image, and generates the learning data based on the acquired learning information, thereby generating the learning data adaptable to a use application for recognizing the target object.

The above-described image includes at least one of an RGB color image, a depth image (distance image), and a monochrome image. The learning information is information necessary for generation of the learning data relating to the target object, and is information relating to the use application for recognizing the target object. More specifically, the learning information is attribute information necessary for learning, and is included in the target object. The learning information includes at least one of a position, a direction, and a type of the target object. In the learning information, geometric information is three-dimensional information, and is associated as two-dimensional information with an image. The learning data is a set of an image and a label used for learning. The label is a teacher signal used for learning and is a symbol indicating classification of the image.

(Configuration of Apparatus)

FIG. 1 is a diagram illustrating the configuration of the object recognition apparatus 1000 provided with the information processing device 100 according to the first exemplary embodiment. The object recognition apparatus 1000 includes the information processing device 100, a learning device (learning unit) 200, a recognition device (recognition unit) 300, a manipulator 400, and an imaging device 500.

The information processing device 100 provides a control value to the manipulator 400 to control the manipulator 400. The manipulator 400 can move the imaging device 500 to image the target object from an optional position and with an optional orientation. The manipulator 400 includes, for example, a hexaxial robot, and can move the imaging device 500 that is mounted near an end effector of the robot.

Further, the information processing device 100 provides an imaging trigger to the imaging device 500, and acquires an image captured by the imaging device 500 that has received the imaging trigger. The information processing device 100 uses the image acquired from the imaging device 500 to generate the learning data. The imaging device 500 may be a device (camera) that captures a color image and a depth image of the target object. The imaging device 500 performs imaging at timing of receiving the imaging trigger from the information processing device 100, and transmits an image signal to the information processing device 100. In addition, the imaging device 500 performs imaging also at timing of receiving an imaging trigger from the recognition device 300 described below, and transmits an image signal to the recognition device 300.

The learning device 200 uses the learning data generated by the information processing device 100 to learn and save a CNN model. The recognition device 300 provides the imaging trigger to the imaging device 500, and acquires an image captured by the imaging device 500 that has received the imaging trigger. The recognition device 300 uses the image acquired from the imaging device 500 to perform recognition processing of the target object. The recognition device 300 uses the CNN model saved by the learning device 200 and the image acquired from the imaging device 500 to recognize the target object in the image.

The information processing device 100 includes a learning information acquiring unit 101, an imaging position and orientation generation unit 102, a control unit 103, an image acquiring unit 104, a learning data generation unit 105, and a learning data accumulation unit 106.

The learning information acquiring unit 101 acquires learning information input by a user, and provides the learning information to the imaging position and orientation generation unit 102 and the learning data generation unit 105. In the first exemplary embodiment, a case where the learning information is information relating to a position to be learned in the target object and an allowable displacement distance is described. The above-described position to be learned is a center position of the target object, and the learning information acquiring unit 101 acquires three-dimensional position information (three-dimensional center position) as the learning information. The imaging position and orientation generation unit 102 generates an imaging position and orientation with six-degree of freedom based on the learning information provided from the learning information acquiring unit 101, and provides the imaging position and orientation to the control unit 103 and the learning data generation unit 105.

The control unit 103 provides a control value to the manipulator 400 to control the manipulator 400 so as to move the imaging device 500 to the imaging position and orientation that is provided from the imaging position and orientation generation unit 102. When the imaging device 500 is moved to the instructed imaging position and orientation, the control unit 103 provides an imaging trigger to the imaging device 500. The image acquiring unit 104 acquires an image from the imaging device 500, and provides the acquired image to the learning data generation unit 105.

The learning data generation unit 105 associates the learning information provided from the learning information acquiring unit 101 with the image provided from the image acquiring unit 104, based on the imaging position and orientation provided from the imaging position and orientation generation unit 102. The learning data generation unit 105 converts the three-dimensional center position acquired as the learning information, into a two-dimensional point and associates the two-dimensional point with the image. Further, the learning data generation unit 105 generates the learning data, based on the image and the learning information (two-dimensional point and distance) associated with the image, and provides the generated learning data to the learning data accumulation unit 106. The learning data accumulation unit 106 saves the learning data provided from the learning data generation unit 105. The learning data accumulation unit 106 saves the learning data in a storage medium such as a memory.

In the first exemplary embodiment, a case where the information processing device 100, the learning device 200, and the recognition device 300 are separated from one another is described; however, the information processing device 100 may include functions of the learning device 200 and the recognition device 300.

FIG. 2 is a diagram illustrating an example of a hardware configuration of the information processing device 100.

The information processing device 100 includes a central processing unit (CPU) 11, a read only memory (ROM) 12, a random access memory (RAM) 13, an external memory 14, a display unit 15, an input unit 16, a communication interface (I/F) 17, and a system bus 18.

The CPU 11 totally controls operation in the information processing device 100, and controls the units (12 to 17) through the system bus 18. The ROM 12 is a non-volatile memory that holds a control program and the like necessary for execution of processing by the CPU 11. The program may be held by the external memory 14 or a detachable storage device (not illustrated). The RAM 13 functions as a main memory, a work area, and the like of the CPU 11. In other words, for example, the CPU 11 loads necessary programs from the ROM 12 to the RAM 13 to execute the processing, and executes the programs to realize various kinds of functional operation.

The external memory 14 holds various kinds of data and various kinds of information necessary when the CPU 11 performs the processing using the programs. Further, the external memory 14 holds various kinds of data and various kinds of information that are acquired when the CPU 11 performs the processing using the programs. The external memory 14 may save the above-described learning data.

The display unit 15 includes a monitor such as a liquid crystal display (LCD). The input unit 16 includes a keyboard and a pointing device such as a mouse, and allows the user of the information processing device 100 to provide instructions to the information processing device 100. The communication I/F 17 is an interface to communicate with external devices (in first exemplary embodiment, learning device 200, manipulator 400, and imaging device 500). The communication I/F may be, for example, a local area network (LAN) interface. The system bus 18 communicably connects the CPU 11, the ROM 12, the RAM 13, the external memory 14, the display unit 15, the input unit 16, and the communication I/F 17 to one another.

The functions of the respective units of the information processing device 100 illustrated in FIG. 1 are realized when the CPU 11 executes the programs. At least a portion of the units of the information processing device 100 illustrated in FIG. 1, however, may operate by way of dedicated hardware. In this case, the dedicated hardware operates under the control of the CPU 11.

(Recognition Processing)

The operation of the object recognition apparatus 1000 is described below with reference to FIG. 3A.

First, in step S1, the information processing device 100 generates and saves the learning data. Detail of the learning data generation processing is described below. After the information processing device 100 generates the learning data, the processing proceeds to step S2. In step S2, the learning device 200 learns the CNN model with use of the learning data saved by the information processing device 100, and saves the CNN model.

In step S3, the recognition device 300 acquires the image from the imaging device 500, and recognizes the target object in the image with use of the CNN model saved by the learning device 200. More specifically, the recognition device 300 recognizes a center position of the target object from the image. Then, the recognition device 300 outputs a recognition result and the processing ends. The recognition result may be used, for example, as a suction position of the object by a robot in which a suction device is mounted on an end effector.

(Learning Data Generation Processing)

Figure 3C:
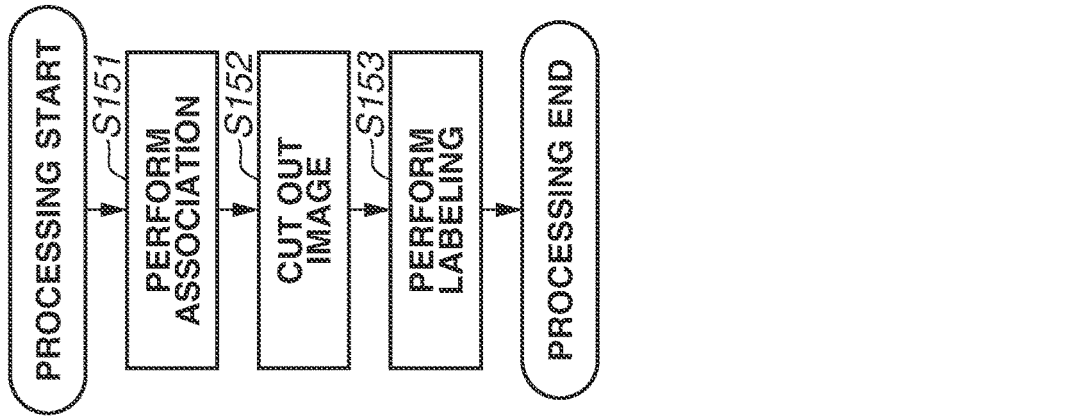
FIGS. 3A, 3B, and 3C are flowcharts each illustrating processing by the information processing device according to one or more aspects of the present disclosure.
Figure 3B:
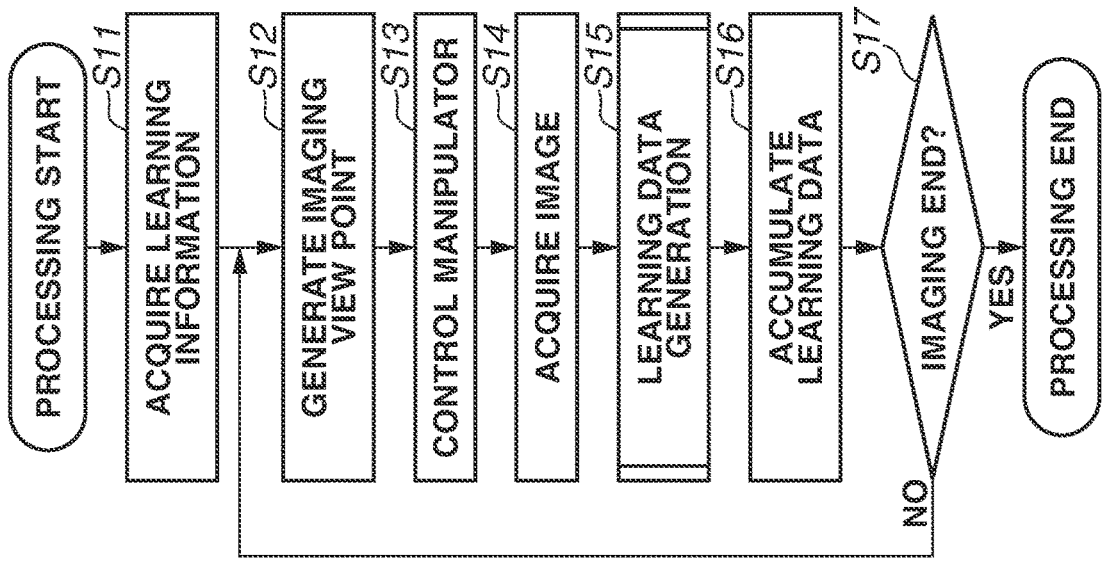
Figure 3A:
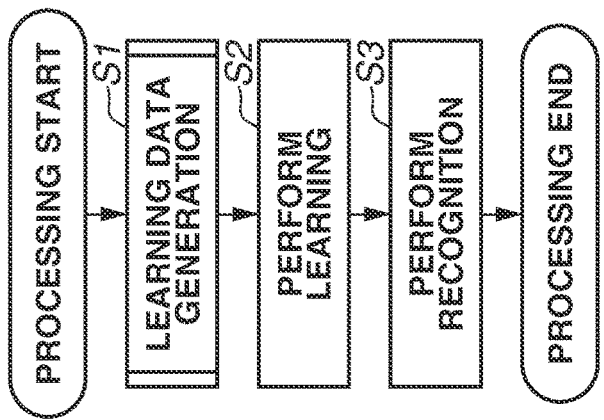

FIG. 3B is a flowchart illustrating a procedure of the learning data generation processing executed by the information processing device 100 in step S1 of FIG. 3A. The CPU 11 reads out and executes the necessary programs, which allows the information processing device 100 to execute the processing illustrated in FIG. 3B. As described above, at least a portion of the units in the information processing device 100 illustrated in FIG. 1 may operate by way of the dedicated hardware to execute the processing of FIG. 3B. In this case, the dedicated hardware operates under the control of the CPU 11 of the information processing device 100.

In step S11, the learning information acquiring unit 101 acquires the learning information input by the user. The learning information is information relating to the target object necessary for generation of the learning data, and indicates items to be learned. In the learning information, three-dimensional information is acquired as the geometric information. As described above, in the first exemplary embodiment, the recognition processing is processing for recognizing the center position of the target object from the image, and the learning information is information relating to the center position of the target object and the allowable displacement distance. The user may designate a point or a range in the image to input the learning information, or may input the learning information by numerical values.

In the first exemplary embodiment, a case is described where the user operates the input unit 16 of the information processing device 100, and designates the center position (point) of the target object and the allowable displacement distance (range) with respect to the image previously imaged by the imaging device 500. The learning information acquiring unit 101 acquires, as the learning information, three-dimensional information of the center position in a robot coordinate system and the allowable displacement distance, and provides the acquired learning information to the imaging position and orientation generation unit 102 and the learning data generation unit 105. The processing then proceeds to step S12.

Figure 4:
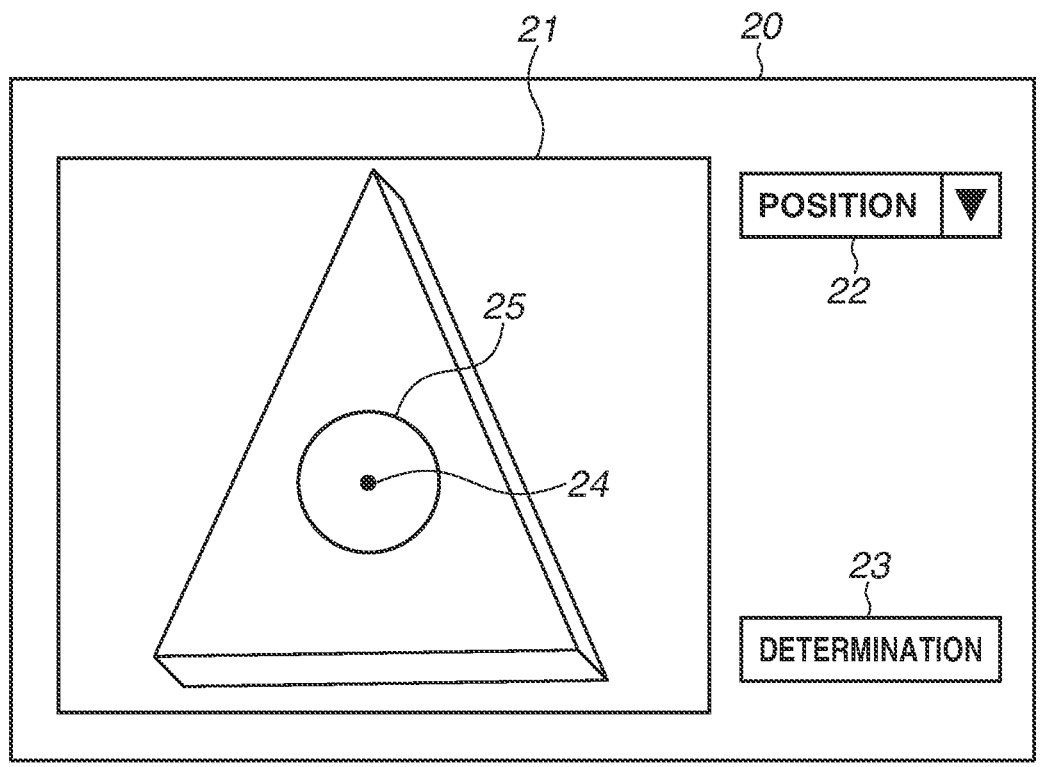
FIG. 4 illustrates an example of an input screen of learning information according to one or more aspects of the present disclosure.

A method of inputting the learning information is specifically described below. FIG. 4 is a diagram illustrating an input screen 20 of the learning information. The input screen 20 is displayed on the display unit 15 of the information processing device 100, and is presented to the user.

The input screen 20 includes an image display section 21 on which the image captured by the imaging device 500 is displayed, a designation section 22 for designating a type of learning information to be input, and a determination button 23 for instructing end of inputting. The types of the learning information include, for example, a position, an orientation, a size, a kind, a direction, and an allowable displacement distance of the target object. The user operates the input unit 16 such as a mouse to perform button operation and inputting.

First, the user selects the type of learning information from a pull-down list of the designation section 22. Next, the user performs the inputting (mouse click or mouse drag) corresponding to the type of the learning information selected in the designation section 22, on the image displayed on the image display section 21. For example, in a case of designating the center position of the target object, the user selects "position" in the designation section 22, and then designates a point 24 on the image in the image display section 21. In a case of designating the allowable displacement distance of the center position of the target object, the user selects "allowable displacement distance" in the designation section 22, and then designates a range 25 on the image in the image display section 21. The user presses the determination button 23 after finishing the necessary input.

Upon pressing the determination button 23, the information relating to the learning information input by the user through the input screen 20 is converted into three-dimensional information in the robot coordinate system, and the three-dimensional information is provided to the learning information acquiring unit 101. More specifically, first, information relating to the center position on the image and the allowable displacement distance input by the user is converted into the three-dimensional information relating to the center position and the allowable displacement distance in a camera coordinate system, with use of the depth image. Next, the position in the camera coordinate system is converted into a position in the robot coordinate system by the following expressions (1) and (2), and the position in the robot coordinate system is provided to the learning information acquiring unit 101.

$$H = P \cdot C \tag{1}$$

$$\begin{bmatrix} x \\ y \\ z \\ 1 \end{bmatrix} = H \begin{bmatrix} x' \\ y' \\ z' \\ 1 \end{bmatrix} \tag{2}$$

The above-described expression (1) is a relational expression of the imaging position and orientation, the position and orientation of the robot, and the attachment position and orientation of the imaging device 500. The matrix H indicates the imaging position and orientation in the robot coordinate system, the matrix P indicates the position and orientation of the end effector in the robot coordinate system, and the matrix C indicates the position and orientation of the imaging device 500 relative to the end effector. With respect to the matrix C, calibration is previously performed to make a calculation. The above-described expression (2) is a conversion expression from the camera coordinate system into the robot coordinate system, and x, y, and z indicate a position in the robot coordinate system, and x', y' and z' indicate a position in the camera coordinate system.

Referring back to FIG. 3B, in step S12, the imaging position and orientation generation unit 102 generates the imaging position and orientation based on the learning information acquired in step S11. To enhance recognition capability in the recognition processing of the target object, the learning data must be rich in variation. To generate such learning data, images that are obtained by imaging the target object from a plurality of different positions and orientations are required. Further, the required variation is different depending on the learning target and the recognition application.

Accordingly, in the first exemplary embodiment, the imaging position and orientation generation unit 102 generates the position and orientation at which the image for generation of the learning data is imaged, based on the learning information. For example, the imaging position and orientation generation unit 102 randomly generates the imaging position and orientation of the imaging device 500 which is located on a hemisphere with the center point of the target object serving as a center, and fixedly views a vicinity of the center of the target object. In step S12, the imaging position and orientation generation unit 102 generates one viewpoint as the imaging position and orientation, and provides the generated imaging position and orientation to the control unit 103 and the learning data generation unit 105.

In step S13, the control unit 103 controls the manipulator 400 with use of the above-described expression (1) so as to move the imaging device 500 to the imaging position and orientation that is generated by the imaging position and orientation generation unit 102 in step S12. In step S14, the control unit 103 provides the imaging trigger to the imaging device 500, and the image acquiring unit 104 acquires the image from the imaging device 500. The image acquiring unit 104 then provides the acquired image to the learning data generation unit 105.

In step S15, the learning data generation unit 105 associates the learning information acquired by the learning information acquiring unit 101 in step S11, with the image acquired by the image acquiring unit 104 in step S14, thereby generating the learning data. The learning data generation unit 105 then provides the generated learning data to the learning data accumulation unit 106. The learning data generation processing is specifically described below.

FIG. 3C is a flowchart illustrating a procedure of the learning data generation processing to be executed by the learning data generation unit 105 in step S15 of FIG. 3B.

First, in step S151, the learning data generation unit 105 associates the learning information acquired in step S11 with the image acquired in step S14, based on the imaging position and orientation generated in step S12. Here, the learning information acquired in step S11 is the position information in the robot coordinate system. The learning data generation unit 105 uses, for example, the following expressions to convert the three-dimensional center position of the target object in the robot coordinate system into the two-dimensional point projected onto the image.

$$\begin{bmatrix} x' \\ y' \\ z' \\ 1 \end{bmatrix} = H^{-1} \begin{bmatrix} x \\ y \\ z \\ 1 \end{bmatrix} \tag{3}$$

$$u = \frac{x'}{z'} f_x + c_x,$$
$$v = \frac{y'}{z'} f_y + c_y. \tag{4}$$

In the expressions, x, y, and z indicate the center position of the target object in the robot coordinate system, x', y', and z' indicate the center position of the target object in the camera coordinate system, and H indicates the imaging position and orientation in the robot coordinate system. Further, $f_x$ and $f_y$ indicate a focal distance of the camera, $c_x$ and $c_y$ indicate a position of a principle point of the camera, and u and v indicate the center position of the target object in the image. Likewise, the allowable displacement distance is converted into the distance in the image. As a result, the learning information is geometrically projected onto the image, and the learning information is associated with the image. The learning information associated with the image at this time is the two-dimensional point and the image distance.

In other words, in step S151, the learning data generation unit 105 converts the learning information that has been converted from the camera coordinate system into the robot coordinate system in step S11, from the robot coordinate system into the camera coordinate system with use of the imaging position and orientation, and further converts the learning information from the camera coordinate system into the image coordinate system. As described above, the learning information is provided just one time in the camera coordinate system and the imaging position and orientation in the robot coordinate system is reflected to the learning information, which makes it possible to easily generate the learning information in the camera coordinate system for each of the plurality of captured images. The learning information may be provided a plurality of times for the plurality of captured images without limitation to once.

In step S152, the learning data generation unit 105 cuts out the image to be used for learning of the CNN model, based on the image acquired in step S14 and the learning information (two-dimensional point and image distance) associated with the image. For example, the learning data generation unit 105 cuts out the image, using a position randomly shifted from the center position of the target object in the image acquired in step S14, as a center.

In step S153, the learning data generation unit 105 assigns a label to the image cut out in step S152. The label is a teacher signal provided in learning, and is a symbol indicating a classification of the image. In the first exemplary embodiment, a right label is assigned to the image indicating the center of the target object, and a wrong label is assigned to the image not indicating the center in order to recognize the center position of the target object.

More specifically, the learning data generation unit 105 generates the label based on the learning information associated with the image. For example, when displacement between the center position of the cutout image and the center position of the target object in the image is equal to or lower than the allowable displacement distance, the right label is assigned, and otherwise, the wrong label is assigned. As a result, the learning data (image and label) necessary for learning is generated. The label is not limited to the right label and the wrong label. For example, the center position of the target object in the image as it is, may be used as a label.

Referring back to FIG. 3B, in step S16, the learning data accumulation unit 106 saves the learning data generated in step S15. In step S17, the information processing device 100 determines whether to end the capturing of the image for generation of the learning data. More specifically, the information processing device 100 determines whether the learning data has been sufficiently accumulated. For example, the determination may be performed on the basis of whether the learning data generation unit 105 has generated the predetermined number or more of pieces of learning data, or on the basis of imaging density such that the distance of the adjacent imaging positions becomes equal to or lower than a predetermined value.

When the information processing device 100 determines that the learning data has been sufficiently accumulated (Yes in step S17), the processing ends. On the other hand, when the information processing device 100 determines that the learning data has not been sufficiently accumulated (No in step S17), the processing returns to step S12. In other words, after a different viewpoint is generated in step S12, the processes from step S13 to step S17 are executed again. In the first exemplary embodiment, the case where one viewpoint is generated in step S12 is described; however, a plurality of viewpoints may be generated.

As described above, the information processing device according to the first exemplary embodiment acquires the learning information necessary for generation of the learning data with respect to the target object to be recognized, and determines the imaging position and orientation at which the target object is imaged, based on the acquired learning information. In addition, the information processing device 100 controls the manipulator 400 to move the imaging device 500 such that the imaging position and orientation becomes the imaging position and orientation determined based on the learning information, and instructs the imaging device 500 to perform imaging. Then, the information processing device 100 acquires the image of the target object imaged at the above-described imaging position and orientation, and generates the learning data based on the acquired image and the learning information.

As a result, it is possible to efficiently generate the learning data adaptable to the use application for the recognition. For example, in the case where the information relating to the center position of the target object is acquired as the learning information, it is possible to appropriately generate the learning data having a variation which is necessary for use application for recognizing the center position of the target object. Moreover, since the imaging of the image used for generation of the learning data and generation of the learning data are automatically performed, it is possible to reduce work for generating the learning data for the user. This makes it possible to realize a recognizing device adaptable to the use application at a low cost.

In addition, the above-described learning information includes the geometric information of the target object, and the information processing device 100 geometrically projects the learning information onto the image based on the imaging position and orientation to associate the image and the learning information with each other, and generates the learning data based on the image and the learning information projected onto the image. Accordingly, if the learning information is only once provided, the information processing device 100 can reflect the imaging position and orientation to the learning information, and easily associate the learning information with the images captured at the respective imaging positions and orientations. At this time, the geometric information of the learning information is acquired as the three-dimensional information, and is appropriately associated as the two-dimensional information with the image.

Further, since the information processing device 100 acquires the learning information designated by the user, it is possible to appropriately realize the recognizing device intended by the user. Further, the user can operate the input screen 20 as illustrated in FIG. 4 to input the learning information. In other words, the user can designate a point and a range on the image obtained by imaging the target object to input the learning information, which facilitates input of the learning information. Moreover, the information processing device 100 can easily acquire, as the three-dimensional information, the learning information designated on the image by the user, with use of the depth image.

As described above, in the first exemplary embodiment, since a large amount of learning data based on the learning information is automatically generated, it is possible to reduce work for learning the CNN model adaptable to the use application for recognition.

First Modification of First Exemplary Embodiment

In the first exemplary embodiment, the case has been described where the center position of the target object and the allowable displacement distance are used as the learning information; however, the learning information is not limited to those described above. For example, a specific position of the target object may be acquired as the learning information instead of the center position of the target object. In this case, it is possible to construct a CNN model that recognizes the specific position (specific region) in the target object.

Further, as another example, in a case where recognition of the direction of the target object is desired, a reference direction of the target object may be acquired as the learning information. In the case where the direction is acquired as the learning information, the image and an angle of the target object in the image are associated with each other in step S15 of FIG. 3B (step S151 in FIG. 3C). The label (e.g., classification indicating the closest direction among eight directions) is then generated from the angle. As still another example, a symbol indicating a type of the target object may be acquired as the learning information. If the symbol is used for the label, the type of object shown in the image can be learned.

Second Modification of First Exemplary Embodiment

In the first exemplary embodiment, the case has been described where the user designates the point and the range on the image with use of the mouse or the like to input the learning information and the learning information acquiring unit 101 acquires the learning information; however, the method of acquiring the learning information is not limited to the above-described method. The user may directly input a numerical value to designate the point and the range on the image. Further, the learning information acquiring unit 101 may acquire, as the learning information, a position and orientation of the end effector of the manipulator 400 when the end effector is brought into contact with the target object.

Further, the image obtained by imaging the target object may be analyzed to acquire the learning information. For example, in the case where the center position of the target object is to be acquired as the learning information, a region of the target object in the image may be extracted through image analysis to acquire a center of the region. Further, a position which is the learning information may be determined from an image feature amount (e.g., color information). This makes it possible to reduce work for the user setting the learning information.

Third Modification of First Exemplary Embodiment

In the first exemplary embodiment, the imaging position and orientation generation unit 102 randomly arranges the imaging position and orientation on the hemisphere while the center position of the target object that is the learning information is treated as a center of the hemisphere; however, the method of generating the imaging position and orientation is not limited to the above-described method. For example, in the case of constructing a learning model that recognizes rotation of the target object, the target object may be rotated about a predetermined axis to generate a plurality of imaging positions and orientations while the center position of the target object is fixedly viewed from a certain imaging position. Moreover, the range of the imaging position and orientation may be adjusted to avoid collision with a surrounding environment or adjusted in consideration of a movable range of the robot. Thus, the learning data can be efficiently generated placing importance on a recognition objective.

Fourth Modification of First Exemplary Embodiment

In the first exemplary embodiment, the case has been described where the imaging position and orientation generation unit 102 generates the imaging position and orientation based on only the learning information; however, the method of generating the imaging position and orientation is not limited to the above-described method. For example, the image obtained by imaging the target object may be used in addition to the learning information. More specifically, a shape of the target object may be measured from the image. When the target object has a symmetrical shape, the imaging position and orientation of only one side may be generated, or the imaging positions and orientations may be densely generated for a complicated portion. By generating the imaging positions and orientations corresponding to the shape of the target object, the learning data can be efficiently generated.

In addition, the imaging position and orientation generation unit 102 may determine the imaging position and orientation within the range of the imaging position and orientation designated by the user. For example, in a case where photo-appearance of the target object to be recognized is previously known, the user may give an instruction about the imaging position and orientation limiting the position and orientation within that range. Thus, the learning accuracy can be improved. The method of giving the instruction about the imaging position and orientation from the user is described below with reference to FIG. 5.

Figure 5:
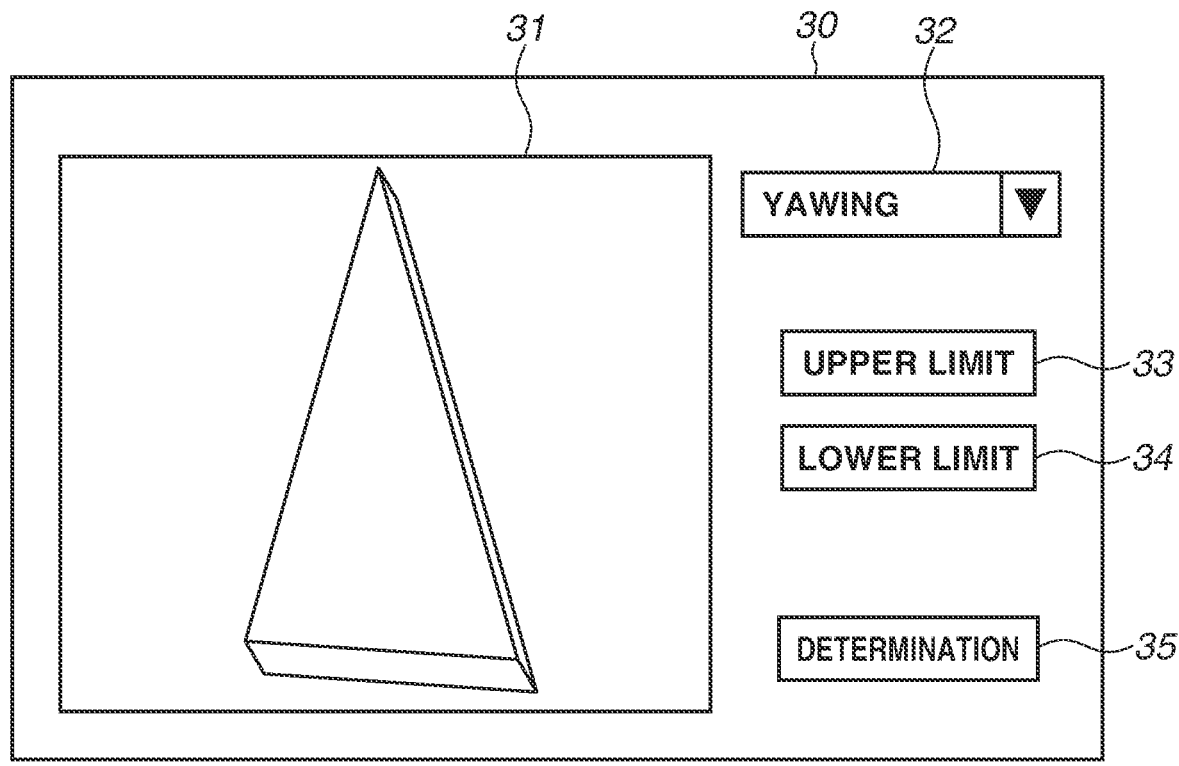
FIG. 5 illustrates an example of an instruction screen of an imaging position and orientation according to one or more aspects of the present disclosure.

FIG. 5 is a diagram illustrating an instruction screen 30 of the imaging position and orientation. The instruction screen 30 is displayed on the display unit 15 of the information processing device 100 and is presented to the user. The instruction screen 30 includes an image display section 31 on which a virtual captured image is displayed, and a designation section 32 for designation of motion of the imaging device 500. Further, the instruction screen 30 includes an upper limit button for designation of an upper limit value of the motion of the imaging device 500, a lower limit button 34 for designation of a lower limit value of the motion of the imaging device 500, and a determination button 35 for instructing end of inputting. In this example, the motion of the imaging device 500 include, yawing, rolling, pitching, parallel movement, etc. The user may operate the input unit 16 such as a mouse and a keyboard to perform button operation and input.

First, the user selects the motion of the imaging device 500 from a pull-down list of the designation section 32. At this time, when the user gives an instruction for virtual movement of the imaging device 500 on the image displayed on the image display section 31 (e.g., through mouse drag), the target object is virtually presented to the user on the image display section 31. The user gives the instruction for movement of the imaging device 500 on the image of the image display section 31, and presses the upper limit button 33 at a position where a portion corresponding to the upper limit of the motion of the imaging device 500 appears, thereby determining the upper limit value of the motion of the imaging device 500. Likewise, the user gives the instruction for movement of the imaging device 500 on the image of the image display section 31, and presses the lower limit button 34 at a position where a portion corresponding to the lower limit of the motion of the imaging device 500 appears, thereby determining the lower limit value of the motion of the imaging device 500. The range of the imaging position and orientation is determined in the above-described manner. The user presses the determination button after finishing the necessary input.

As described above, the user operates the image displayed on the image display section 31 to appropriately designate the range of the imaging position and orientation while confirming a way of photographing (a way of photo-presentation) of the target object which is important for learning. The user may directly input the numerical value (e.g., angle) to designate the upper limit value and the lower limit value of the motion of the imaging device 500.

Fifth Modification of First Exemplary Embodiment

In the first exemplary embodiment, the case has been described where the imaging position and orientation generation unit 102 generates only the imaging position and orientation of the imaging device 500; however, along with that, the imaging position and orientation generation unit 102 may generate other states of the device. For example, in a case where an illumination device is attached near the end effector, the control unit 103 may control a state of illumination (on/off and intensity of illumination) at the time of imaging the target object. Further, in a case where a robot including an illumination device separately exists, the imaging position and orientation generation unit 102 may also generate a position and orientation of the illumination device provided in the robot, and the control unit 103 may control the robot including the imaging device 500 and the robot including the illumination device. This makes it possible to improve robustness of recognition of the target object that is easily influenced by illumination.

Sixth Modification of First Exemplary Embodiment

In the first exemplary embodiment, the case has been described where the manipulator 400 moves the imaging device 500; however, the manipulator 400 may not move the imaging device 500 but move the target object. For example, the robot in which a suction device is attached to the end effector may suction and move the target object, and the target object may be imaged in various positions and orientations by a stationary camera. This makes it possible to realize a recognizing device that recognizes the object suctioned by the robot.

Seventh Modification of First Exemplary Embodiment

In the first exemplary embodiment, the image that has been cut out based on the learning information from the captured image, is used for the learning data; however, the generation of the learning data is not limited to the above-described method. For example, cutout of the image may not be performed, and in order to generate the learning data, the captured image as it is may be used as the image for learning. Alternatively, the learning data may be generated based on the image that has been subjected to geometric conversion such as enlargement/reduction and rotation, or to image processing such as imparting of noise and change of brightness (luminance value) or color in order to increase variation of photo-presentation. Moreover, a plurality of portions may be cut out from one captured image, and each of the portions may be used for obtaining the learning data. In this case, since the plurality of pieces of learning data are generated from one captured image, it is possible to reduce time for capturing the image to be used for generation of the learning data.

In the above-described first exemplary embodiment, the case has been described where the images are obtained by imaging the target object from the plurality of imaging positions and orientations, and the acquired images are all used for generation of the learning data. In the second exemplary embodiment, a case of limiting data used for generation of the learning data is described.

(Configuration of Apparatus)

Figure 6:
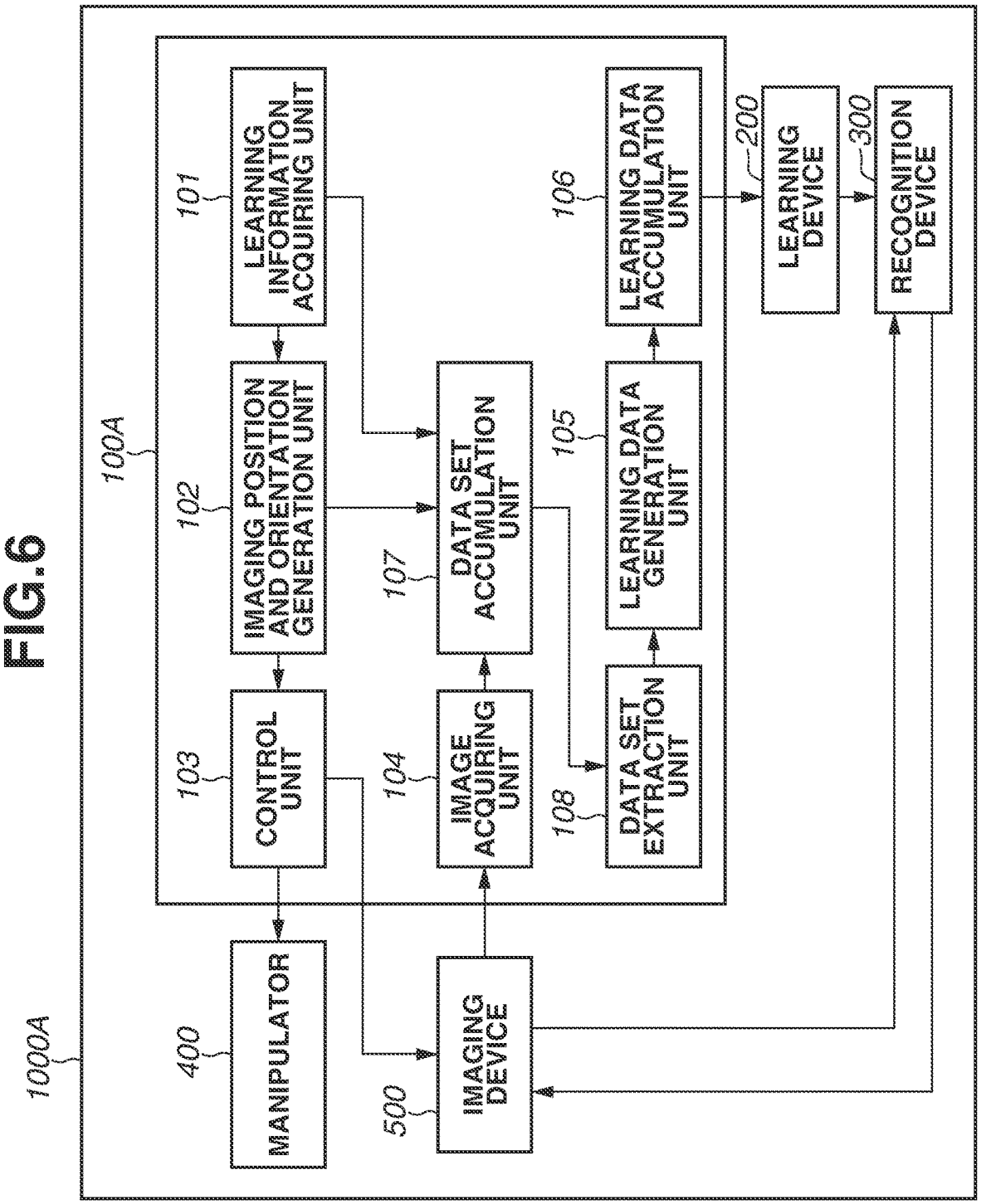
FIG. 6 is a diagram illustrating a configuration of an object recognition apparatus according to one or more aspects of the present disclosure.

FIG. 6 is a block diagram illustrating a configuration of an object recognition apparatus 1000A according to the second exemplary embodiment. In FIG. 6, components having configurations similar to those in FIG. 1 are denoted by the reference numerals same as those in FIG. 1, and components having different configurations are mainly described below.

The object recognition apparatus 1000A includes an information processing device 100A. The information processing device 100A has a configuration similar to the configuration of the information processing device 100 illustrated in FIG. 1 except that a data set accumulation unit 107 and a data set extraction unit 108 are added to the information processing device 100 illustrated in FIG. 1.

The data set accumulation unit 107 receives the image that has been captured by the imaging device 500 and acquired by the image acquiring unit 104, the imaging position and orientation generated by the imaging position and orientation generation unit 102, and the learning information acquired by the learning information acquiring unit 101. The data set accumulation unit 107 then generates and saves a data set that is a set of the received image, the received imaging position and orientation, and the received learning information.

The data set extraction unit 108 extracts a necessary data set with use of at least one of the imaging position and orientation, and the learning information as a key, from the data sets accumulated by the data set accumulation unit 107. The data set extraction unit 108 provides the extracted data set to the learning data generation unit 105. The learning data generation unit 105 uses the data set extracted by the data set extraction unit 108 to generate the learning data.

(Recognition Processing)

A flow of recognition processing by the object recognition apparatus 1000A of the second exemplary embodiment is similar to the flow of the recognition processing (FIG. 3A) of the above-described first exemplary embodiment. The procedure of the learning data generation processing in step S1, however, is different.

Figure 7:
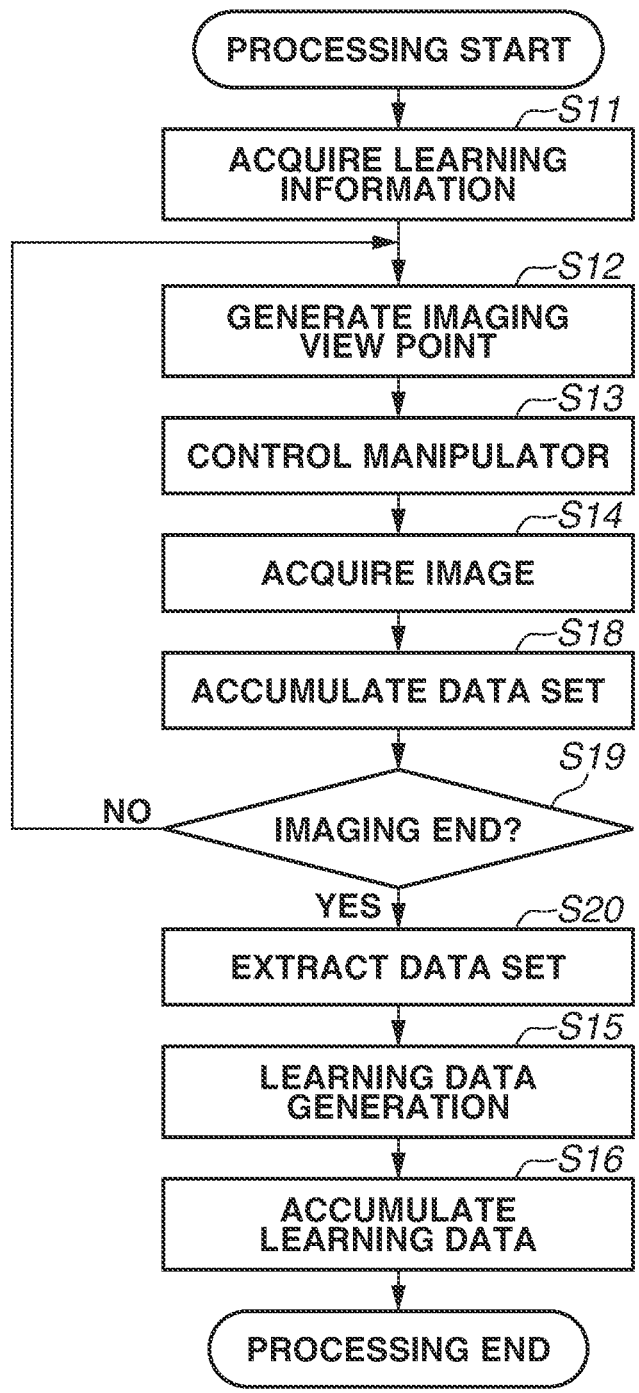
FIG. 7 is a flowchart illustrating processing by an information processing device according to one or more aspects of the present disclosure.

FIG. 7 is a flowchart illustrating a procedure of the learning data generation processing executed by the information processing device 100A in step S1 of FIG. 3A. The processing of FIG. 7 is similar to the processing of FIG. 3B except that processes of steps S18 to S20 are added after step S14 of FIG. 3B and the process in step S17 is removed. Accordingly, a step in which the process same as the process of FIG. 3B is executed is denoted by the step number same as the step number of FIG. 3B, and steps with different processes are mainly described below.

In step S18, the data set accumulation unit 107 receives the learning information, the imaging position and orientation, and the image, from the learning information acquiring unit 101, the imaging position and orientation generation unit 102, and the image acquiring unit 104, respectively, and these are saved as a data set. In step S19, the information processing device 100 determines whether to end capturing of the image for generation of the learning data. The process in step S19 is similar to the process in step S17 of FIG. 3B.

In step S20, the data set extraction unit 108 receives as a key at least one of the learning information and the imaging position and orientation from the user, and extracts relevant data set from the data sets accumulated by the data set accumulation unit 107. The learning information used as the key may be the learning information acquired by the learning information acquiring unit 101 or the learning information associated with (geometrically projected onto) the image captured by the imaging device 500. In the case of using the learning information associated with the image, it is possible to extract data more suitable for the purpose.

For example, the data set extraction unit 108 may acquire the size of the target object as the learning information used as the key. The data set extraction unit 108 may separately extract a data set that includes an image in which the target object is shown in a certain size or larger, and a data set that includes an image in which the target object is shown in a certain size or smaller. In this case, it is possible to learn the images different in scale from different CNN models and to perform integration, thereby realizing a recognizing device that is resistant to scale variation.

As another example, there is a case where a photo-presentation generated in a limited state is to be learned, for example, a case where strong reflected light is photographed due to glossiness when imaging is performed from a certain imaging position and orientation. In such a case, the data set extraction unit 108 may acquire a predetermined imaging position and orientation serving as a key, and extract a data set around the imaging position and orientation. This makes it possible to improve recognition performance.

Further, the key for extraction of the data set may be designated by the user through operation of the input screen. In this case, the learning information, the imaging position and orientation, and the image may be displayed on the input screen, and the user may input the key while confirming photo-presentation of the target object. Further, the input screen may have a function of sorting the data set with use of the learning information and the imaging position and orientation serving as the key. The input screen has a function of browsing the data sets, which allows the user to efficiently select the data set to be extracted from the data sets generated in large quantities. In addition, it is possible for the user to easily confirm whether the collected data sets are appropriate.

As described above, since the information processing device 100A in the second exemplary embodiment appropriately limits the data set used for learning, it is possible to achieve improvement of recognition performance, save the learning cost, and downsize the CNN model.

Modification of Second Exemplary Embodiment

In the second exemplary embodiment, learning information may be newly acquired in the middle of or after the generation of the data set by the data set accumulation unit 107. In this case, the data set accumulation unit 107 may receive the learning information newly acquired, and add the learning information to all of the data sets. Therefore, it is possible to generate different learning data with use of the images already captured. This makes it possible to reduce required work for recapturing the image.

In the third exemplary embodiment, a case is described where additional learning data is generated, based on one or both of the learning result by the learning device 200 and the data sets accumulated by the data set accumulation unit 107.
(Configuration of Apparatus)

Figure 8:
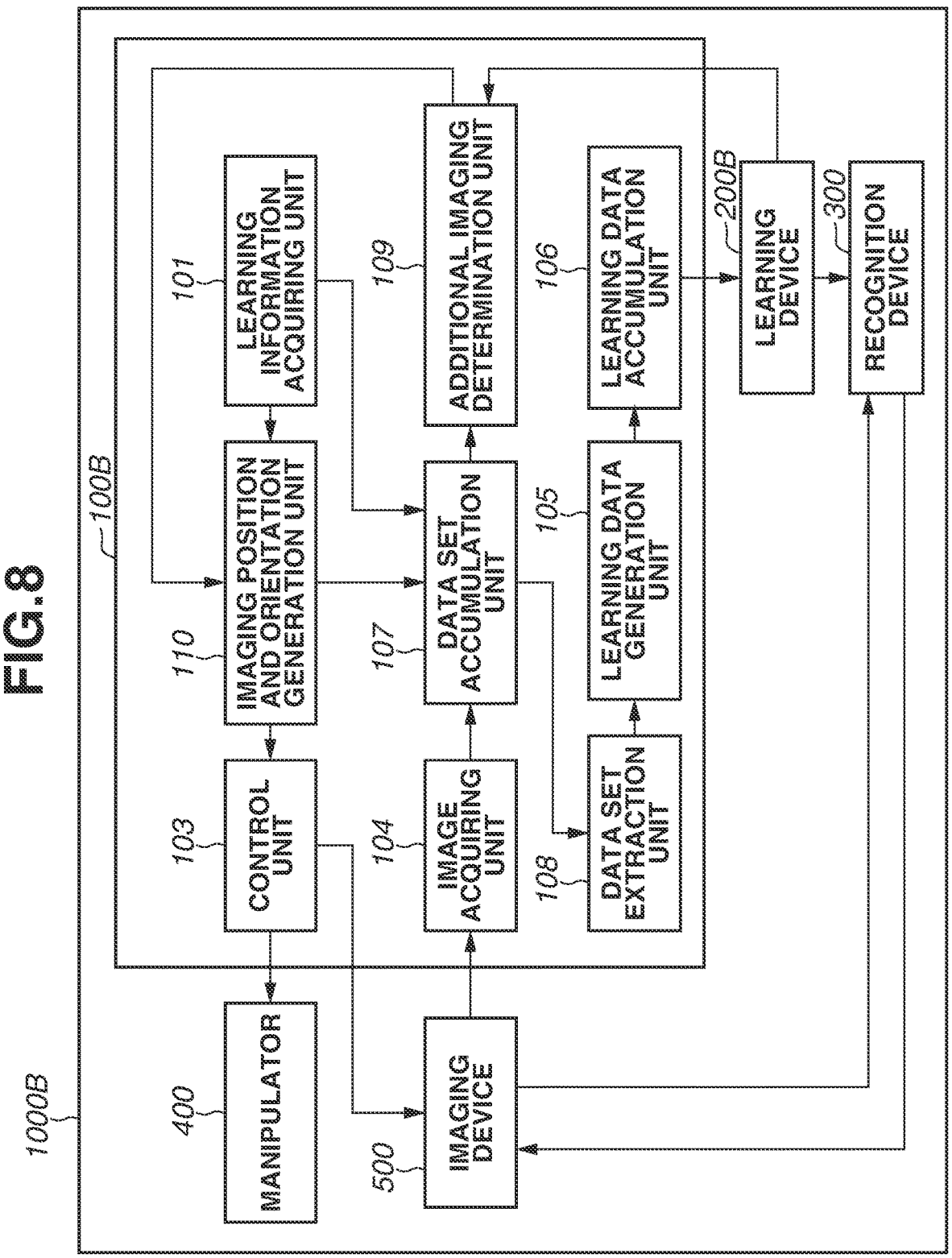
FIG. 8 is a diagram illustrating a configuration of an object recognition apparatus according to one or more aspects of the present disclosure.

FIG. 8 is a block diagram illustrating a configuration of an object recognition apparatus 1000B in the third exemplary embodiment. In FIG. 8, components having configurations similar to those in FIG. 6 are denoted by the reference numerals same as those in FIG. 6, and components having different configurations are mainly described below.

The object recognition apparatus 1000B includes an information processing device 100B. The information processing device 100B has a configuration similar to the configuration of the information processing device 100A illustrated in FIG. 6 except that an additional imaging determination unit 109 is added to the information processing device 100A illustrated in FIG. 6 and the imaging position and orientation generation unit 102 is replaced with an imaging position and orientation generation unit 110.

A learning device 200B learns a CNN model with use of the learning data saved in the learning data accumulation unit 106 and saves the CNN model, as performed by the above-described learning device 200. In the third exemplary embodiment, the learning device 200B provides recognition performance information that indicates a learning result, to the additional imaging determination unit 109. The recognition performance information is information indicating recognition performance, and for example, is information relating to difference between the label of each piece of the learning data and the recognition result.

The additional imaging determination unit 109 uses at least one of the recognition performance information provided from the learning device 200B and the data set saved by the data set accumulation unit 107, to determine whether additional generation of the learning data, namely, additional imaging of the target object is necessary. Further, when the additional imaging determination unit 109 determines that additional imaging of the target object is necessary, the additional imaging determination unit 109 determines a range of the imaging position and orientation at which the additional imaging is performed. The additional imaging determination unit 109 then provides a determination result to the imaging position and orientation generation unit 110.

The imaging position and orientation generation unit 110 generates the imaging position and orientation within the range of the imaging position and orientation provided from the additional imaging determination unit 109.
(Recognition Processing)

FIG. 9 is a flowchart illustrating a flow of recognition processing by the object recognition apparatus 1000B of the third exemplary embodiment. In FIG. 9, the processes in steps S1, S2, and S3 are similar to those in the second exemplary embodiment.

After the learning by the learning device 200B is performed in step S2, the additional imaging determination unit 109 of the information processing device 100B determines in step S4 whether additional imaging of the target object is necessary. More specifically, in a case where recognition performance is insufficient or recognition has failed when the learning has been carried out by the learning device 200B, the additional imaging determination unit 109 determines that additional imaging of the target object is necessary in order to add the learning data. In a case where the additional imaging determination unit 109 determines that additional imaging is necessary (Yes in step S4), the additional imaging determination unit 109 determines the range of the imaging position and orientation at which the additional imaging is required, and the processing returns to step S1.

On the other hand, in a case where sufficient learning has been performed by the learning device 200B (e.g., recognition ratio is equal to or higher than a predetermined ratio), the additional imaging determination unit 109 determines that additional imaging of the target object is not necessary (No in step S4), and the processing proceeds to step S3.

In the case where the recognition performance is insufficient on the whole when the learning has been carried out, the learning data may be generally increased as an improvement way. In this case, the additional imaging determination unit 109 determines that additional imaging is necessary over the entire range of the imaging position and orientation, and the imaging position and orientation generation unit 110 generates an additional imaging position and orientation on the whole such that imaging is performed at a denser imaging position and orientation. At this time, the imaging position and orientation generation unit 110 generates the additional imaging position and orientation such that the imaging is performed at a position that is farthest from the nearest imaging position and orientation at which imaging has been already performed because it is not effective to overlap imagings with one another in the vicinity of the imaging position at which the imaging has been already performed. Thus, the additional learning data can be efficiently generated, and the recognition performance can be improved on the whole.

Further, in the case where recognition of the learning data generated from the image captured at a certain imaging position and orientation has failed when the learning is carried out, it is considered that the learning data near the position and orientation is insufficient. Therefore, in this case, the additional imaging determination unit 109 determines, as the range of the imaging position and orientation at which additional imaging is necessary, the range of a radius centering around the recognition failure position and representing a distance to an imaging position which is the closest to the recognition failure position. The imaging position and orientation generation unit 110 generates the additional imaging position and orientation in order to further generate the learning data within the range. As a result, it is possible to generate the learning data similar to the photo-presentation which is difficult to recognize. As a consequence, the recognition performance can be appropriately improved.

As described above, the information processing device 200B according to the present exemplary embodiment can generate the additional learning data near the imaging position and orientation that does not achieve a good recognition performance in learning or near the imaging position and orientation where data quantity is low, so that the recognition performance can be improved. At this time, the information processing device 200B determines the imaging position and orientation which is insufficient for learning from the learning result or the data sets, and automatically repeats the additional generation of the learning data and carries out relearning. Accordingly, it is possible to improve recognition performance while reducing work required for learning.

(Modifications)

In the above-described exemplary embodiments, the case has been described where the imaging device 500 obtains an RGB color image and a depth image. The imaging device 500, however, may be a device configured to obtain a monochrome image. Further, the imaging device 500 may be a device configured to obtain an infrared image.

Moreover, in the above-described exemplary embodiments, the case where the manipulator 400 is a hexaxial robot has been described; however, it is sufficient for the manipulator 400 to move at least one of the imaging device 500 and the target object. In other words, the manipulator 400 may be a multi-articulated robot, a parallel link robot, or an orthogonal robot. Moreover, the manipulator 400 may be a movement mechanism other than the robot.

Further, in the above-described exemplary embodiments, the case has been described where the learning data accumulation unit 106 saves the learning data, and then, the learning device 200 (200B) performs learning of the CNN model; however, the learning is not limited thereto. For example, the learning may be performed by inputting the learning data to the CNN model while generating the learning data.

Moreover, in the above-describe exemplary embodiments, the case has been described where the CNN that is a kind of deep learning is learned to make up the recognizing device; however, the configuration is not limited thereto. As the feature amount, a local binary pattern (LBP), bag of features (BoF), etc. may be used. In addition, as the recognizing device, a decision tree, a support vector machine (SVM), etc. may be used.

Furthermore, in the above-described exemplary embodiments, the recognition result is used in the suction position of the robot; however, the recognition result may be used when a robot controls a guiding position or a direction of a tool, or may be used in inspection work, etc.

Other Exemplary Embodiment

The present disclosure can be realized by supplying a program that realizes one or more of the functions of the above-described embodiments, to a system or an apparatus through a network or a storage medium, and by reading and executing the program by one or more processors in a computer of the system or the apparatus. Further, the present disclosure is achievable by a circuit (e.g., application specific integrated circuit (ASIC)) that achieves one or more functions.

The present disclosure makes it possible to easily generate the learning data adaptable to the use application for recognizing the target object.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2017-008219, filed Jan. 20, 2017, which is hereby incorporated by reference herein in its entirety.

What is claimed is:

1. An information processing device comprising:
one or more processors; and one or more memories storing executable instructions which, when executed by the one or more processors, cause the information processing device to perform operations including:
acquiring, as a first acquisition, a position of a portion configured to allow holding a target object having a surface, wherein the position is received from input by a user and the input is with respect to model data representing the target object,
determining a plurality of viewpoints for capturing the target object to include the acquired position,
acquiring, as a second acquisition, a plurality of images of the target object captured from the determined plurality of viewpoints, and
generating learning data, wherein the generated learning data is a first set of:
(a) captured images of the target object captured from the plurality of viewpoints, and
(b) positions of image features that are included in the plurality of images respectively and are similar to feature data existing at the acquired position of the model data representing the target object, and
wherein the generated learning data is data for generating, from an input image, a learned model for outputting the position of the portion configured to allow holding the target object included in the input image.

2. The information processing device according to claim 1, wherein the first acquisition acquires a center acquired position on the surface of the target object as the acquired position of the model data representing the target object.

3. The information processing device according to claim 1, wherein the first acquisition acquires information about a position, a direction, a size, and a kind of the target object.

4. The information processing device according to claim 1, wherein the first acquisition acquires three-dimensional information about the acquired position on the surface of the target object.

5. The information processing device according to claim 1,
wherein the generated learning data also is a second set of
(i) an image used for learning and (ii) a label serving as a teacher signal, and
wherein the label is information indicating a classification of the image used for learning.

6. The information processing device according to claim 1, wherein executing the executable instructions causes the information processing device to perform further operations including:
moving an imaging device which captures the target object so that the target object is captured by imaging at a predetermined viewpoint, and
controlling the imaging of the imaging device.

7. The information processing device according to claim 6, wherein controlling the imaging of the imaging device further includes controlling an illumination state when the imaging device captures the target object.

8. The information processing device according to claim 1, wherein generating includes generating the learning data based on an image acquired by performing at least one of the following: processing of geometric conversion, changing of a luminance value, or performing color change on an image from the captured images of the target object of the first set.

9. The information processing device according to claim 1, wherein executing the executable instructions causes the information processing device to perform further operations including:
accumulating, as data sets, the acquired position on the surface of the target object and images captured at the plurality of viewpoints, and
extracting a data set, from the accumulated data sets, using at least one of the acquired position and the plurality of viewpoints as a key,
wherein generating includes generating the learning data based on the extracted data set.

10. The information processing device according to claim 1, wherein executing the executable instructions causes the information processing device to perform further operations including learning the learned model with use of the generated learning data.

11. The information processing device according to claim 10, wherein learning the learned model includes learning the learned model with use of convolution neural network (CNN).

12. The information processing device according to claim 10, wherein executing the executable instructions causes the information processing device to perform further operations including recognizing the acquired position on the surface of the target object in a learned model image based on a model learned from learning the learned model.

13. The information processing device according to claim 12,
wherein executing the executable instructions causes the information processing device to perform further operations including determining, based on a result of recognition of the target object in the learned model image, whether additional generation of the learning data is necessary,
wherein, in a case where a recognition rate is lower than or equal to a predetermined value based on the result of the recognition, determining includes determining that additional generation of the learning data is necessary, where the recognition rate is probability of success of the recognition, and
wherein, in a case where the recognition rate is higher than the predetermined value, determining includes ending generation of the learning data.

14. The information processing device according to claim 1, further comprising:
an imaging device configured to image the target object; and
a manipulator configured to move the imaging device.

15. The information processing device according to claim 1, wherein the generated learning data is a learning image.

16. The information processing device according to claim 1, wherein generating includes generating the learning data including an image of the target object captured at a known viewpoint and the acquired position.

17. The information processing device according to claim 1,
wherein acquiring, as the first acquisition, includes acquiring attention region information including a vicinity of the acquired position, and
wherein generating includes generating the learning data including a region corresponding to the attention region information as acquired at the plurality of viewpoints.

18. The information processing device according to claim 1, wherein the acquired position indicates a position where the surface of the target object is sucked by a suction device.

19. The information processing device according to claim 1, wherein the acquired position indicates a position where a manipulator and the target object come into contact with each other.

20. The information processing device according to claim 1, wherein a viewpoint indicates a position on a hemisphere with the acquired position on the target object as a center.

21. A method for an information processing device, the method comprising:
  acquiring, as a first acquisition, a position of a portion configured to allow holding a target object having a surface, wherein the position is received from input by a user and the input is with respect to model data representing the target object;
  determining a plurality of viewpoints for capturing the target object to include the acquired position;
  acquiring, as a second acquisition, a plurality of images of the target object captured from the determined plurality of viewpoints; and
  generating learning data, wherein the generated learning data is a first set of:
  (a) captured images of the target object captured from the plurality of viewpoints, and
  (b) positions of image features that are included in the plurality of images respectively and are similar to feature data existing at the acquired position of the model data representing the target object, and
  wherein the generated learning data is data for generating, from an input image, a learned model for outputting the position of the portion configured to allow holding the target object included in the input image.

22. A non-transitory computer-readable storage medium storing a program to cause a computer to perform a method for an information processing device, the method comprising:
  acquiring, as a first acquisition, a position of a portion configured to allow holding a target object having a surface, wherein the position is received from input by a user and the input is with respect to model data representing the target object;
  determining a plurality of viewpoints for capturing the target object to include the acquired position;
  acquiring, as a second acquisition, a plurality of images of the target object captured from the determined plurality of viewpoints; and
  generating learning data, wherein the generated learning data is a first set of:
  (a) captured images of the target object captured from the plurality of viewpoints, and
  (b) positions of image features that are included in the plurality of images respectively and are similar to feature data existing at the acquired position of the model data representing the target object, and
  wherein the generated learning data is data for generating, from an input image, a learned model for outputting the position of the portion configured to allow holding the target object included in the input image.

* * * * *